United States Patent
Lim et al.

(10) Patent No.: US 11,730,576 B2
(45) Date of Patent: Aug. 22, 2023

(54) MACHINABLE DENTAL BULK BLOCK AND METHOD OF MANUFACTURING SAME

(71) Applicant: HASS CO., LTD., Gangwon-do (KR)

(72) Inventors: Hyung Bong Lim, Gyeonggi-do (KR); Yong Su Kim, Gangwon-do (KR)

(73) Assignee: HASS CO., LTD., Gangwondo (KR)

( * ) Notice: Subject to any disclaimer, the term of this patent is extended or adjusted under 35 U.S.C. 154(b) by 274 days.

(21) Appl. No.: 17/096,332

(22) Filed: Nov. 12, 2020

(65) Prior Publication Data
US 2022/0096212 A1 Mar. 31, 2022

(30) Foreign Application Priority Data
Sep. 28, 2020 (KR) .................. 10-2020-0125746

(51) Int. Cl.
| | | |
|---|---|---|
| A61C 13/00 | (2006.01) | |
| A61C 13/08 | (2006.01) | |
| A61C 13/083 | (2006.01) | |
| B28B 11/04 | (2006.01) | |
| B28B 11/08 | (2006.01) | |

(Continued)

(52) U.S. Cl.
CPC ........ *A61C 13/0022* (2013.01); *A61C 13/082* (2013.01); *A61C 13/083* (2013.01); *B28B 11/044* (2013.01); *B28B 11/0845* (2013.01); *B28B 11/12* (2013.01); *C03B 32/02* (2013.01); *C03C 10/0027* (2013.01)

(58) Field of Classification Search
None
See application file for complete search history.

(56) References Cited

U.S. PATENT DOCUMENTS

| | | | |
|---|---|---|---|
| 6,420,288 B2 | 7/2002 | Schweiger et al. | |
| 2015/0374465 A1* | 12/2015 | Bürke | A61C 5/73 433/201.1 |
| 2018/0099900 A1 | 4/2018 | Vollmann et al. | |

FOREIGN PATENT DOCUMENTS

| | | |
|---|---|---|
| EP | 3 293 157 A1 | 3/2018 |
| JP | 2014-515722 A | 7/2014 |

(Continued)

OTHER PUBLICATIONS

International Search Report dated Jun. 23, 2021 for corresponding International Application No. PCT/KR2020/013297.

(Continued)

*Primary Examiner* — Elizabeth Collister
(74) *Attorney, Agent, or Firm* — Pearne & Gordon LLP (57) ABSTRACT

Disclosed is a machinable dental bulk block that is a glass ceramic block including an amorphous glass matrix and crystalline phases introduced into the matrix. A major crystalline phase is lithium disilicate and minor crystalline phases are lithium phosphate and at least one of spodumene and virgilite. The dental block is made of a functionally gradient material in which the major crystalline phase exhibits a gradient of particle sizes in a depth direction of the dental block and which has no interface at a point where the gradient of particle sizes of the major crystalline phase changes. The dental bulk block is useful for production of a dental prosthesis (artificial tooth) similar to a natural tooth. The dental bulk block can reduce time and the number of processing steps to manufacture a dental prosthesis and provides improved structural stability through good force distribution obtained by functionally graded mechanical properties.

15 Claims, 9 Drawing Sheets

(51) Int. Cl.
*B28B 11/12* (2006.01)
*C03B 32/02* (2006.01)
*C03C 10/00* (2006.01)

(56) References Cited

FOREIGN PATENT DOCUMENTS

| | | |
|---|---|---|
| JP | 2017-521481 A | 8/2017 |
| JP | 2017-214286 A | 12/2017 |
| JP | 2017-218379 A | 12/2017 |
| JP | 2018-145084 A | 9/2018 |
| KR | 10-2018-0102711 B1 | 9/2018 |
| KR | 10-1975548 B1 | 9/2018 |
| WO | 2012/143137 A1 | 10/2012 |
| WO | 2015/034860 A1 | 3/2015 |

OTHER PUBLICATIONS

Extended European Search Report dated May 10, 2021 for corresponding European Application No. 20206200.6.
M.R. Lindsay, "Development of Lithium Disilicate Microstructure Graded Class-Ceramic", Virginia Polytechnic Institute and State University, Blacksburg, Virginia, May 21, 2012.
Japanese Office Action dated Dec. 14, 2021 for corresponding Japanese Application No. 2020-187423 and English translation.
Lindsay, M. R., "Development of Lithium Disilicate Microstructure Graded Glass-Ceramic", Thesis of Virginia Polytechnic Institute and State University, 2012.

\* cited by examiner

MACHINABLE DENTAL BULK BLOCK AND METHOD OF MANUFACTURING SAME

CROSS REFERENCE TO RELATED APPLICATION

The present application claims priority to Korean Patent Application No. 10-2020-0125746, filed Sep. 28, 2020, the entire contents of which is incorporated herein for all purposes by this reference.

TECHNICAL FIELD

The present disclosure relates to a machinable dental bulk and a method of manufacturing the same, the dental bulk block being useful for production of an artificial tooth having structural characteristics similar to those of a natural tooth.

BACKGROUND

A crown material refers to a prosthetic material to restore the shape, function, integrity, and morphology of a missing portion (for example, dentin and/or enamel) of a tooth. The crown material is used for production of inlays, onlays, veneers (partial crowns), and crowns which are dental prostheses termed depending on an area to which the crown material is applied. When selecting a crown material, aesthetic properties are important factors to be considered because the location where a crown material is applied is usually a surface portion of a tooth, and a high mechanical strength is also an important factor because wear and chipping of dental prostheses are likely to occur due to friction with a counter tooth. Existing crown materials include leucite glass-ceramics, reinforced porcelains, fluorapatite ($Ca_5(PO_4)_3F$), and crystallized glass. These materials are good in aesthetic properties but are poor in strength. For example, the mechanical strength of those materials ranges from 80 MPa to 120 MPa. Therefore, research is currently underway to develop high-strength crown materials.

Lithium silicate crystallized glass was first reported by Marcus P. Borom and Anna M. Turkalo in the pacific coast regional meeting of the American ceramic society (San Francisco, Calif., Oct. 31, 1973 (Glass division, No. 3-G-73P)).

Crystalline phases and strengths were studied with glass of $Li_2O$—$Al_2O_3$—$SiO_2$—$Li_2O$—$K_2O$—$B_2O_3$—$P_2O_5$ for various heat treatment conditions set for nucleation and crystallization. High-temperature lithium disilicate crystalline phase changed from low-temperature lithium metasilicate exhibited a strength of 30 to 35 KPS due to the residual stress attributable to differences in thermal expansion coefficients between a glass matrix, a base glass, a $Li_2SiO_5$ phase, and a $Li_2SiO_3$ phase.

Materials and methods for making monolithic dental crowns with glass containing lithium disilicate crystals are disclosed in several patent documents. However, the materials prepared by the known techniques have poor workability due to coarse crystalline phases thereof. Therefore, such materials are machined through the processes: primarily changed into lithium metasilicate crystalline phase which is a machinable crystalline phase; machined (for example, cut) into a desired shape; and secondarily changed into a high-strength lithium disilicate crystalline phase through a thermal treatment. However, this method has a problem in that material shrinkage occurs due to thermal treatment that deteriorates dimension accuracy of final products and the manufacturing process becomes complicated due to the presence of a thermal treatment. In general, since CAD/CAM techniques aim at chairside production of prostheses so as to be tried as quickly as possible on the patient in a dental clinic, time delay attributable to a thermal treatment process imposes a cost increase on the patient or the user.

In addition, conventional lithium disilicate crystallized glass materials have limitations in obtaining high transmittance or opalescence similar to natural teeth due to the coarse crystal phase thereof.

The existing lithium disilicate crystallized glass materials are produced through the processes of: producing lithium metasilicate that is partially crystallized and has good workability, through a first heat treatment; machining the lithium metasilicate into a desired shape; and changing the lithium metasilicate into lithium disilicate having an increased mechanical strength, through a second heat treatment. In this state, since the crystalline phase has a coarse particle size (for example, 3 μm or more), the workability significantly deteriorates and only the strength can be increased.

As a technique of solving this problem, Korean Patent No. 10-1975548 owned by the applicant of the present patent application discloses a method of preparing a crystallized glass that is composed of lithium disilicate crystalline phase and lithium silicate crystalline phase and which has good workability. The method features a process of adjusting the size of crystals by suitably controlling the temperature for a first thermal treatment process. Specifically, the patent document discloses a method of preparing crystallized glass containing silicate crystalline phases for dental prostheses. The method includes a glass composition preparation step, a first heat treatment process, and a second heat treatment process. The glass composition comprises: 60 to 83 wt % of $SiO_2$; 10 to 15 wt % of $Li_2O$; 2 to 6 wt % of $P_2O_5$ which acts as a nucleating agent; 1 to 5 wt % of $Al_2O_3$ that increases the glass transition point and softening point and which improves resistance to chemicals; 0.1 to 3 wt % of SRO which increases the softening point of glass; 0.1 to 2 wt % of ZnO serving as a colorant; and 2.5 to 6 wt % of $Na_2O$ and $K_2O$ which are alkali metal oxides increasing a thermal expansion coefficient of glass. The first heat treatment process is to heat the glass composition in a temperature range of 400° C. to 850° C. to produce glass. Through this first heat treatment process, the glass containing lithium silicate crystalline phase and silica crystalline phase which are nano-particles having a size of 5 to 2000 nm is generated. The second heat treatment process is to heat the resulting glass in a temperature range of 780° C. to 880° C. to adjust the transmittance of the glass.

On the other hand, as the living standard of humans improves, there is an increasing demand for aesthetic properties of dental restorations in the field of dentistry. To meet the increasing aesthetic desire of patients, study is actively being conducted on materials for aesthetic prosthetic restorations.

As to currently used restoration materials, factors that affect the aesthetic properties of ceramic restorations include external shape, surface condition, transparency, and color tone of teeth. Among these factors, transparency is the most important factor for the successful production of an aesthetic restoration. There have been many studies and developments on the mechanical and physical properties of ceramics as materials for aesthetic prosthetics, but there is still much room for improvement in the harmony of color tones.

Specifically, there are many difficulties in selecting color tones and transparency of restorations in clinical and technical aspects.

In aesthetic prosthetics, factors that affect the aesthetics of prostheses during teeth restoration include tooth colors, tooth shapes and tooth sizes, an arrangement and ratio of teeth, light rays, transmittance values, and designs of restorations. Among the factors, color and form are visually sensitive factors.

Each natural tooth does not have the same color through the entire area thereof, i.e., from the cervical margin to the incisal edge of the tooth.

In the recent years, a so-called build-up method for manufacturing an artificial tooth that can imitate the color of a natural tooth is known.

The build-up method is a method of forming a tinted artificial tooth by laminating multiple layers of powder such as porcelain or zirconia powder and then heat-treating the tinted artificial tooth to create a color similar to that of a natural tooth. Although this method can provide a color similar to a natural tooth, since the aesthetics of an artificial tooth produced through this method entirely depend on the skills of a technician, the method has a problem of low reproducibility. In addition, the method is not suitable for chairside production of a dental restoration because the dental restoration cannot be produced through the method in a short time. Therefore, it is not advantageous to the patient. Furthermore, it is difficult to apply a CAD/CAM machining operation such as a cutting operation to the method.

On the other hand, when an artificial tooth is manufactured by performing a CAD/CAM machining operation such as a cutting operation on a conventional bulk block, since the bulk block is made of a material that exhibits uniform physical properties through the entire area thereof, an artificial tooth having a single color tone unlike a natural tooth having various color tones is produced. Therefore, when artificial teeth produced by the method are applied as front teeth, there is a problem that naturalness cannot be obtained because they give an aesthetically different feeling from natural teeth.

In the case of the crystallized glass manufacturing method described in Korean Patent No. 10-1975548, although it is possible to control transparency and workability of glass through a secondary heat treatment process, the obtained crystallized glass has the uniform physical properties through the entire area of the produced glass. Therefore, to realize a deep color similar to that of a natural tooth with the use of the glass manufactured through the method, it is necessary to combine glass materials having different properties. In other words, it is not easy to produce natural-colored artificial teeth by performing CAD/CAM machining such as a cutting operation on the glass materials manufactured through the method.

BRIEF SUMMARY

An objective of the present disclosure is to provide a machinable dental bulk block that can be used to easily manufacture an artificial tooth that exhibits multi-gradation transmittance and physical properties similar to those of a natural tooth without using other CAD/CAM machining operations than a cutting operation, thereby improving reproducibility in the production of artificial teeth.

Another objective of the present disclosure is to provide a machinable dental bulk block that can shorten a time and the number of process steps to manufacture an artificial tooth (dental prostheses) and which has an increased structural stability due to good force distribution attributable to graded mechanical properties.

A further objective of the present disclosure is to provide a method of preparing a machinable dental bulk block to be used for the production of an artificial tooth (i.e., dental restoration) that exhibits multi-gradation transmittance and have physical properties similar to those of natural teeth.

A yet further objective of the present disclosure is to provide a method of easily producing a dental restoration from a dental bulk block using a mechanical processing machine.

One aspect of the present disclosure provides a dental bulk block that is a glass ceramic block and is made of a functionally graded material including an amorphous glass matrix and crystalline phases introduced into the amorphous glass matrix. The crystalline phases include lithium disilicate as a major crystalline phase and lithium phosphate and at least one of spodumene and virgilite as a minor crystalline phase. The major crystal phase has a gradient of particle sizes along a depth direction and has no interface at a point where a gradient value of the particle sizes changes.

In one embodiment of the present disclosure, the gradient of particle sizes of the major crystalline phase may be set such that an average particle size is within a range of from 0.05 μm to 1.5 μm.

In one embodiment of the present disclosure, the dental bulk block may have a gradient of transmittance values along a depth direction.

In one embodiment of the present disclosure, the gradient of transmittance values may be within a range of 20% to 80% with respect to a wavelength of 550 nm.

In one embodiment of the present disclosure, the dental bulk block may have a gradient of L*, a*, b* values along a depth direction of the dental bulk block, the L*, a*, b* values being obtained through color difference analysis, in which a color difference ΔE) value may change within a depth range of 0.31 mm.

In one embodiment of the present disclosure, the dental bulk block may have a crystallinity of 35% to 70%.

In one embodiment of the present disclosure, the dental bulk block may have a gradient of flexural strength values along a depth direction.

In one embodiment of the present disclosure, the gradient of the flexural strength values may be within a range of 220 MPa to 450 MPa.

In one embodiment of the present disclosure, the dental bulk block may be obtained from a single glass composition.

In one embodiment of the present disclosure, the glass composition may include 65.0 to 73.0 wt % of $SiO_2$, 12.0 to 14.0 wt % of $Li_2O$, 3.3 to 8.2 wt % of $Al_2O_3$, 0.12 to 0.22 wt % of ZnO, 2.8 to 3.5 wt % of $X_2O$, 0.12 to 0.22 wt % of $Na_2O$, and 2.0 to 6.0 wt % of $P_2O_5$, in which a molar ratio of $Al_2O_3/(K_2O+ZnO)$ may be within a range of 1.3 to 2.0.

Another aspect of the present disclosure provides a method of manufacturing a machinable dental bulk block, the method including: preparing a block having a predetermined shape from a glass composition including 65.0 to 73.0 wt % of $SiO_2$, 12.0 to 14.0 wt % of $Li_2O$, 3.3 to 8.2 wt % of $Al_2O_3$, 0.12 to 0.22 wt % of ZnO, 2.8 to 3.5 wt % of $X_2O$, 0.12 to 0.22 wt % of $Na_2O$, and 2.0 to 6.0 wt % of $P_2O_5$, in which a molar ratio of $Al_2O_3/(K_2O+ZnO)$ may be within a range of 1.3 to 2.0; and heat-treating the block at a temperature within a range of 760° C. to 880° C. while applying a temperature gradient to the block in a depth direction.

In the method according to one embodiment of the present disclosure, the heat-treating of the block may be performed such an upper portion of the block is heated at a temperature range of 840° C. to 880° C. and a lower portion of the block is heated at a temperature range of 760° C. to 800° C.

In a preferred embodiment, the heat-treating of the block may be performed for 1 minute to 40 minutes at an operating temperature of 900° C. to 1100° C. in a temperature-gradient heat treatment furnace.

A further aspect of the present disclosure provides a method of manufacturing a dental restoration. The method includes: producing a predetermined dental restoration by machining the machinable bulk dental block according to one embodiment of the present disclosure with a mechanical processing machine; and polishing or glazing the dental restoration.

In the method according to one preferred embodiment, the glazing may be performed at a temperature within a range of 730° C. to 820° C. for 30 seconds to 10 minutes.

In the method according to one embodiment, the glazing may be a heat treatment process performed at a temperature of 825° C. or higher to adjust the transmittance of the dental restoration. Preferably, the glazing may be performed for 1 to 20 minutes at a temperature of at least 825° C.

The dental bulk block according to the present disclosure can be used to manufacture an artificial tooth (dental restoration) having multi-gradation transmittance and physical properties similar to those of natural teeth, with high reproducibility, without using other CAD/CAM machining operations than a cutting operation. The dental bulk block can shorten the time and the number of process steps of manufacturing an artificial tooth (prostheses) and can increase the structural stability of the artificial tooth through good force distribution obtained by functionally graded mechanical properties. The dental bulk block can be easily manufactured through a simple method called temperature-gradient heat treatment from a single glass composition.

BRIEF DESCRIPTION OF THE DRAWINGS

The above and other objectives, features, and other advantages of the present disclosure will be more clearly understood from the following detailed description taken in conjunction with the accompanying drawings, in which.

DETAILED DESCRIPTION OF EMBODIMENTS

The foregoing and other aspects of the present disclosure will become more clearly apparent through preferred embodiments described with reference to the accompanying drawings. Hereinafter, embodiments of the present disclosure will be described in detail such that those skilled in the art can easily understand and reproduce them.

A machinable dental bulk block according to one embodiment of the present disclosure is a glass ceramic block made of a functionally gradient material including an amorphous glass matrix and crystalline phases formed in the matrix. The crystalline phases include a major crystalline phase and a minor crystalline phase. The major crystalline phase is composed of lithium disilicate, and the minor crystalline phase is composed of lithium phosphate and at least one of spodumene and virgilite. The major crystalline phase has a gradient of particle sizes in a depth direction and has no interface at a point at which the gradient of particle sizes changes.

Throughout the description herein, the term "major crystalline phase" is defined as a crystalline phase that accounts for at least 50% by weight of the total weight of crystals, and the term "minority crystalline phase" is defined as a crystalline phase that accounts for the remaining fraction of the total weight of the crystals.

The content (i.e., fraction) of each crystalline phase with respect to the total crystalline phase is calculated through X-ray diffraction analysis. For example, for a sample with crystalline phases a and b, a fraction $F_a$ of the crystalline phase "a" is quantitatively represented by Equation 1.

$$F_a = \frac{1}{1 + K\left(\frac{I_b}{I_a}\right)} \qquad <\text{Equation 1}>$$

This value can be obtained by measuring the intensity ratio of the two crystalline phases and by obtaining an integer K. K is a ratio of the absolute intensities $I_a/I_b$ of the two pure crystalline phases a and b and is measured from a reference material.

In the description herein, the term "major crystalline phase" is defined on the basis of the content (fraction) determined by this method.

In addition, the expression "a major crystalline phase has a gradient of particle sizes in a depth direction" means that, when the particle sizes of the major crystalline phase at respective depths of a bulk block are plotted in a graph, the changes in its particle size of the major crystalline phase show a gradient in the depth direction. That is, it means that the particle size of the major crystalline phase gradually varies with a depth of the bulk block.

In addition, the term "point at which a gradient value of particle sizes of a major crystalline phase changes" means a point at which a change in the gradient value of the particle sizes of the major crystalline phase is actually observed in a graph in which the particle sizes measured at the respective depths of the bulk block are plotted. Here, the term "substantial change" means a change that can be represented by a single numerical value and also refers to a significant change noticeable from a distribution of the values.

In addition, the expression "no interfacial layer exists at a position at which a gradient value of particle sizes of a major crystalline phase changes" means that meaningful or noticeable interlayer gradient materials are not present at a depth at which a change in the gradient of the particle sizes of the main crystalline phase occurs. That is, the bulk block has no interfacial layer in the depth direction so that the particle size of the major crystalline phase gradually and continuously varies along the depth direction.

The term "functionally graded material (FGM)" refers to a material in which a certain property of a constituent component continuously varies from one side to the other. In the present disclosure, the term "functionally graded material" refers to a material in which no interface exists in the depth direction while a physical property of a constituent component continuously varies in the depth direction.

In the bulk block according to the present disclosure, the major crystalline phase is lithium disilicate, and the minor crystalline phase is composed of lithium phosphate and at least one of spodumene and virgilite. The bulk block according to the present disclosure has no other crystalline phases except for lithium disilicate and lithium phosphate.

Figure 1:
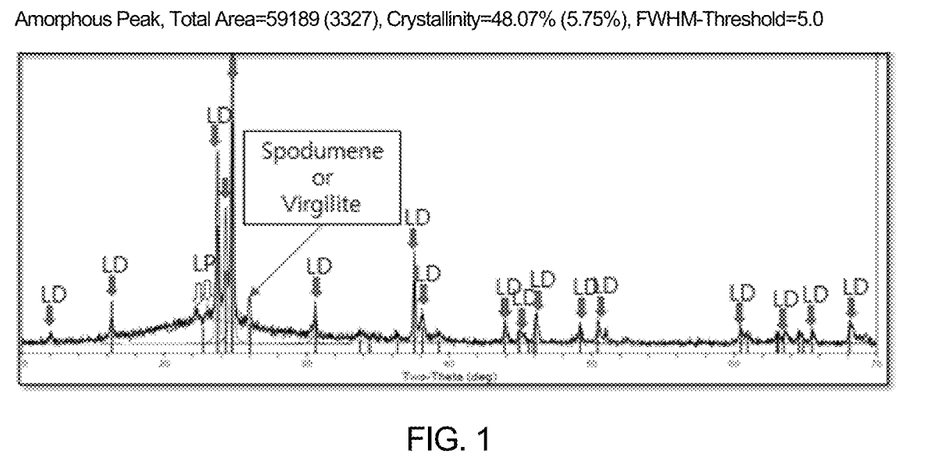
FIG. 1 is a graph illustrating the results of an X-ray diffraction analysis performed on a dental bulk block according to one embodiment of the present disclosure.

An X-Ray Diffraction Data (XRD) analysis result graph for a bulk block according to one preferred embodiment is illustrated in FIG. 1.

In FIG. 1, in the dental bulk block according to one embodiment of the present disclosure, lithium disilicate is the major crystalline phase. In addition, the minor crystalline phase is determined to be lithium phosphate (JCPDS #15-0760, a characteristic peak at 2θ=22.3 and 23.1 degrees) because a characteristic peak occurs at 2θ=22.18 and 22.9 degrees. In addition, since a characteristic peak also occurs at 2θ=26.0 degrees, it is determined that spodumene (JCPDS #35-0794, 35-0797, 2θ=25.8 (degree)) or virgilite (JCPDS #21-053, 2θ=25.9 (degree)) is present.

The XRD analysis described herein will be understood as an analysis using an X-ray diffractometer (for example, D/MAX-2500 manufactured by Rigaku Corporation (Japan); Copper K-α (40 kV, 60 mA); scanning rate: 6°/min; 2θ: 10 to 70 degrees).

The crystalline phases include fine crystals having various sizes, and a distribution of particle sizes depends on a temperature, thereby exhibiting various mechanical properties and optical transmittances.

In addition, since the main crystalline phase has a gradient of particle sizes along the depth direction of the bulk block, graded transmittance values and graded mechanical properties are exhibited in the depth direction of the bulk block. Furthermore, since no interface exists at the point at which the gradient value of the particle sizes of the main crystalline phase changes, it is not necessary to perform an interlayer joining process, and it is possible to solve the problem of separation of layers during a cutting operation. It is also possible to provide an artificial tooth (dental prostheses) having increased structural stability by distributing force due to a gradient of mechanical properties.

In the bulk block according to one embodiment of the present disclosure, as to the gradient of particle sizes of the main crystalline phase, an average particle size is within a range of 0.05 μm to 1.5 μm.

Figure 2:
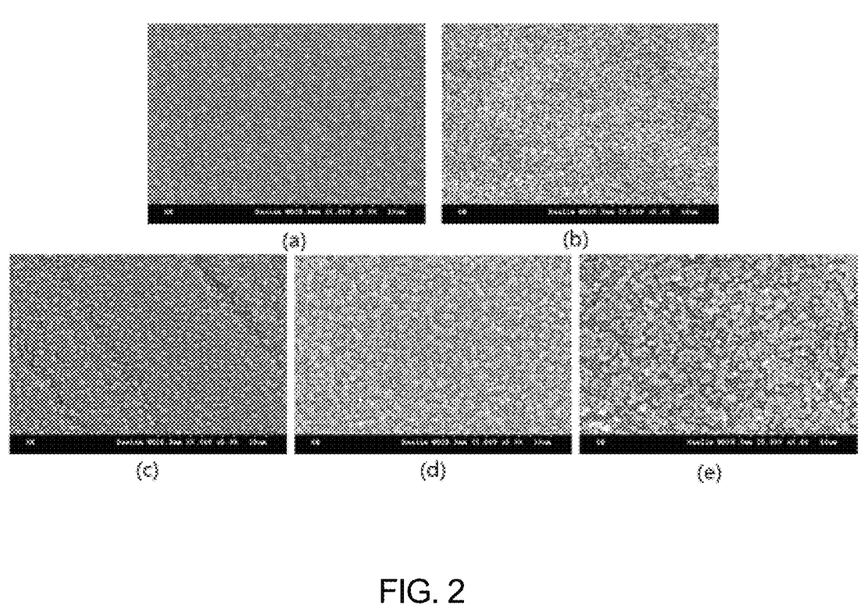
FIG. 2 is a scanning electron microscopy (SEM) image illustrating microstructures and crystalline particle sizes at several depths of a bulk block according to one embodiment of the present disclosure.

For example, FIG. 2 illustrates scanning electron microscope (SEM) images of a dental bulk block according to one embodiment of the present disclosure. In FIG. 2, SEM images (a) through (e) show the microstructures of the observation planes of five samples obtained by equally slicing a bulk block into five slices in a depth direction. The transmittance is gradually decreased from the SEM image (a) to the SEM image (e).

The average particle size of the crystalline phase is obtained on the basis of the SEM images. Specifically, the average particle size of the crystalline phase can be calculated using the linear intercept method in which a diagonal straight line or a random linear line is drawn on the SEM image, the number of crystalline phases across which the straight line extends is divided by the length of the straight line, and the magnification of the SEM image is applied.

In the description herein, the particle size of the crystalline phase is calculated through the method.

The bulk block according to one embodiment of the present disclosure is made of a functionally graded material. The functionally graded material is processed by a cutting operation of the CAD/CAM machining operations. In terms of mechanical workability (machinability) and exhibition of a clinically usable transmittance suitable for an artificial tooth (dental restoration), the gradient of particle sizes of the major crystalline phase is determined such that the average particle size is within a range of 0.05 μm to 1.5 μm.

Since the major crystalline phase in the dental bulk block according to the present disclosure has a particle size gradient, the dental bulk block has a gradient of transmittance values along the depth direction.

The gradient of transmittance values with respect to a wavelength of 550 nm is within a range of 20% to 80% when the dental bulk block has a gradient of particle sizes of the major crystalline phase.

In the description herein, the transmittance is measured using a UV-visible spectrometer (UV-2401PC manufactured by Shimadzu Corporation in Japan).

In another aspect, the dental bulk block according to one embodiment of the present disclosure has a gradient of shades. Specifically, the dental bulk block has a gradient of $L^*$, $a^*$, and $b^*$ values in the depth direction. As described above, since the dental bulk block according to the present disclosure has no interface at the point at which the gradient of the particle sizes of the major crystalline phase changes, it is confirmed that the value of the color difference ΔE varies in the depth direction even within a depth range of 0.31 mm of the dental bulk block.

A color system was devised because color standardization is required for accurate measurement, delivery, and reproduction of colors. There are many existing color systems. Among them, the most widely used one is a CIE $L^*a^*b^*$ color space (also called CIELAB color space) established by Commission International del'Eclairage (CIE) in 1976. $L^*$ represents lightness, and $a^*$ and $b^*$ represent chromaticity coordinates. As to $L^*$, a larger value represents a brighter color and a smaller value represents a darker value. As to $a^*$, a positive value represents a red color and a negative value represents a green color. As to $b^*$, a positive value represents a yellow color and a negative value represents a blue color.

In order to measure the color at predetermined positions in the depth direction of the dental bulk block, the dental bulk block is sliced by a thickness of 0.31 mm in the depth direction in which the transmittance gradually decreases to produce samples. Next, the surface of each sample is cleaned with ethanol and the color is measured with a UV-visible spectrometer (UV-2401PC manufactured by Shimadzu Corporation in Japan). In this measurement, the wavelength range was 380 to 780 nm and the slit width was 2.0 nm. A baseline was set using a reference sample and the reflectance of the reference sample was measured to obtain an $L^*a^*b^*$ color system. The $L^*a^*b^*$ values were measured three times, and an average value of the measurements was used to reduce an error. These three values were used to obtain a color difference ΔE. When the value of the color difference ΔE between two samples is 0, there is no color difference between the two samples. When the value of the color difference ΔE is within a range of 1 to 2, it means that there is a slight color difference between the two samples. A value range of 2 to 4 means that the color difference between the two samples is noticeable, and a value range of 4 to 6 means that the color difference between the two samples is easily appreciable. A value range of 6 to 12 means that the color difference is large, and values of 12 or more mean that the color difference is very large.

As illustrated in FIGS. 1 and 2, the dental bulk block according to the present disclosure is a glass ceramic block including an amorphous glass matrix and crystalline phases introduced into an amorphous glass matrix. The dental bulk block is made of a functionally graded material in which a major crystalline phase is lithium disilicate and minor crystalline phases are lithium phosphate and at least one of spodumene and virgilite. The major crystalline phase has a gradient of particle sizes along a depth direction of the dental bulk block. The dental bulk block has no interface at a point at which the value of the gradient of particle sizes of the major crystalline phase changes. It is confirmed from Table 1 that when the dental bulk block is sliced into 0.31 mm-thick samples, the value of a color difference ΔE between the samples is within a range of 4.1 to 6.1. The results show that the transmittance value varies within a depth e range of 0.31 mm. That is, a gradient shade is observed even within the thickness range. This clearly shows that the dental bulk block according to the present disclosure is a functionally graded material.

TABLE 1

| Sample No. | Depth(mm) | L* | a* | b* | ΔE |
|---|---|---|---|---|---|
| 1 | 0.31 | 67.23 | 0.72 | 12.52 | — |
| 2 | 0.62 | 71.55 | −0.22 | 13.89 | 4.4 |
| 3 | 0.93 | 73.25 | −0.24 | 14.12 | 6.1 |
| 4 | 1.24 | 75.54 | −0.21 | 14.81 | 4.1 |
| 5 | 1.55 | 78.25 | 0.02 | 15.23 | 5.1 |

In addition, the dental bulk block according to the present disclosure has a flexural strength gradient in the depth direction thereof. The flexural strength gradient is within the range of 220 MPa to 450 MPa when taking into account the average particle size of the particle size gradient.

On the other hand, it is preferable that the crystallinity of the dental bulk block is in a range of 35% to 70% to ensure the machining workability and functionally graded physical properties as described above, In the description herein, the term "crystallinity" is defined as a ratio of the crystalline phase to the amorphous glass matrix and can be calculated through various methods. In one embodiment of the present disclosure, the crystallinity is calculated with an X-ray diffractometer.

The machinable dental bulk block according to the present disclosure is made from a single glass composition. That is, the machinable dental bulk block is a glass ceramic block including an amorphous glass matrix and crystalline phases formed in the matrix. The major crystalline phase of the crystalline phases is lithium disilicate and the minor crystalline phases are lithium phosphate and at least one of spodumene and virgilite. The dental bulk block is a functionally graded material in which the major crystalline phase has a size gradient in a depth direction and there is no interface at a point where a size gradient value changes.

Preferably, the glass composition includes 65.0 wt % to 73.0 wt % of $SiO_2$, 12.0 wt % to 14.0 wt % of $Li_2O$, 3.3 wt % to 8.2 wt % of $Al_2O_3$, 0.12 wt % to 0.22 wt % of ZnO, 2.8 wt % to 3.5 wt % of $K_2O$, 0.12 wt % to 0.22 wt % of $Na_2O$, and 2.0 wt % to 6.0 wt % of $P_2O_5$, in which a molar ratio of $Al_2O_3/(K_2O+ZnO)$ is within a range of 1.3 to 2.0.

The glass composition sequentially undergoes crystal nucleation and crystal growth heat treatment so that crystalline phases are generated in an amorphous glass matrix. The temperature at which crystal nucleation and crystal growth occur in the glass composition is within a range of 760° C. to 880° C. That is, crystal nucleation begins at a temperature of 760° C. and crystal growth occurs at elevated temperatures than that. When the crystal growth is performed at a maximum temperature of 880° C., the dental bulk block exhibits the lowest optical transmittance for use as a material for an artificial tooth. That is, until the temperature increases to 880° C. after the crystal growth begins, the transmittance gradually decreases. Therefore, when a single bulk block can exhibit locally different transmittances, the bulk block can implement a multi-gradation color similar to that of a natural tooth.

As to natural teeth, the transmittance locally varies not only within a single natural tooth but also among multiple natural teeth. If transmittance variation can be implemented by one bulk block through thermal treatments, the gradations of the color of a natural tooth can be implemented by the bulk block.

In this regard, the present disclosure provides a method of manufacturing a dental bulk block.

Figure 3:
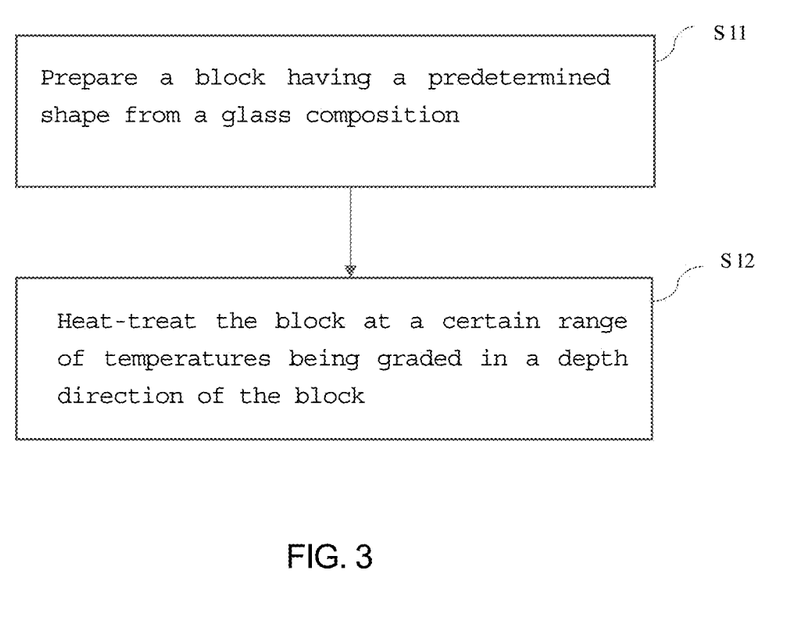
FIG. 3 illustrates an example flowchart for manufacturing a machinable dental bulk block in accordance with an embodiment of this disclosure.

FIG. 3 illustrates an example flowchart for manufacturing a machinable dental bulk block in accordance with an embodiment of this disclosure.

The method of manufacturing a machinable dental bulk block includes step S11 of preparing a block having a predetermined shape from a glass composition including 65.0 wt % to 73.0 wt % of $SiO_2$, 12.0 wt % to 14.0 wt % of $Li_2O$, 3.3 wt % to 8.2 wt % of $Al_2O_3$, 0.12 wt % to 0.22 wt % of ZnO, 2.8 wt % to 3.5 wt % of $K_2O$, 0.12 wt % to 0.22 wt % of $Na_2O$, and 2.0 wt % to 6.0 wt % of $P_2O_5$, in which a molar ratio of $Al_2O_3/(K_2O+ZnO)$ is within a range of 1.3 to 2.0; and step S12 of heat-treating the block in a temperature range of 760° C. to 880° C., in which the heat treatment is performed while giving a temperature gradient or a temperature gradients along a depth direction of the block.

As described above, the glass composition exhibits different light transmittance characteristics depending on the temperature range of the heat treatment. That is, when the heat treatment is performed such that the entire block is uniformly heated, the entire block exhibits a uniform transmittance. However, when the block is heated to locally different temperatures, the block can exhibit multiple gradations of transmittance or physical property.

A bulk block is used as a workpiece to undergo CAD/CAM machining. The method of the present disclosure causes a temperature gradient or temperature gradients in the depth direction of a block during the heat treatment, thereby producing a bulk block having transmittance gradients and strength gradients.

Conventional crystallized glasses have coarse crystals and high hardness. Therefore, conventional crystallized glasses have poor workability. On the other hand, the glass composition according to the present disclosure can produce a glass ceramic material having fine crystals. In addition, the fine crystals have different sizes according to heat treatment temperatures so that the glass ceramic has a large distribution of particle sizes. That is, the glass ceramic exhibits regional variation in transmittance and physical properties. The present disclosure is based on this phenomenon. That is, a glass block is made from a single glass composition and then the glass block is heat-treated at regionally different temperatures. That is, the glass block is heated in a condition in which a temperature gradient or temperature gradients are formed. The condition of the temperature gradient results in a transmittance gradient and a physical property gradient in the heat-treated block.

The step of heating a glass block under a condition of a temperature gradient refers to a case where the upper end of the glass block is heated to the highest temperature and the temperature gradually decreases toward the lower end of the glass block. Alternatively, in the step of heating, the temperature may decrease stepwise from the upper end to the lower end of the glass block. The type of the temperature gradient may be determined depending on the characteristics of the natural teeth of a patient who is in need of the dental prostheses (artificial teeth) or may be determined depending on the characteristics of a region of a tooth to be restored.

Given the characteristics of natural teeth, a preferable temperature gradient for heat treatment is set such that the temperature gradually increases in the depth direction from the bottom to the top of the block.

In one preferred example, the heat treatment is performed such that an upper portion of the block is heated to a temperature range of 840° C. to 880° C. and a lower portion of the block is heated to a temperature range of 760° C. to 800° C. In order to achieve this temperature gradient, the heat treatment is performed for one minute to 40 minutes at an operating temperature range of 900° C. to 1100° C. within a temperature gradient furnace.

When the glass composition described above is used in the heat treatment method of the present disclosure, it is possible to mimic the structure of a natural tooth in which the transmittance of the tooth increases toward the incisal edge from the cervical edge of the tooth. Therefore, it is not necessary to perform an additional characterization process when manufacturing a dental prosthesis, and the dental prostheses can be economically manufactured.

A natural tooth has physical properties such that the surface layer (called enamel) of the tooth has a high flexural strength and the underlying dentin has a low flexural strength. Thus, the dentin absorbs and distributes external forces applied to the tooth. According to the present disclosure, since the microstructures formed in the dental bulk block through a temperature-gradient heat treatment differ depending on position in the depth direction, a functionally graded material having a gradient of a mechanical property such as flexural strength can be obtained. Therefore, it is possible to reproduce a dental restoration having very similar physical properties to a natural tooth.

When manufacturing a dental restoration using a dental bulk block obtained through the method of the present disclosure, it is expected that the workability is significantly improved.

Figure 4:
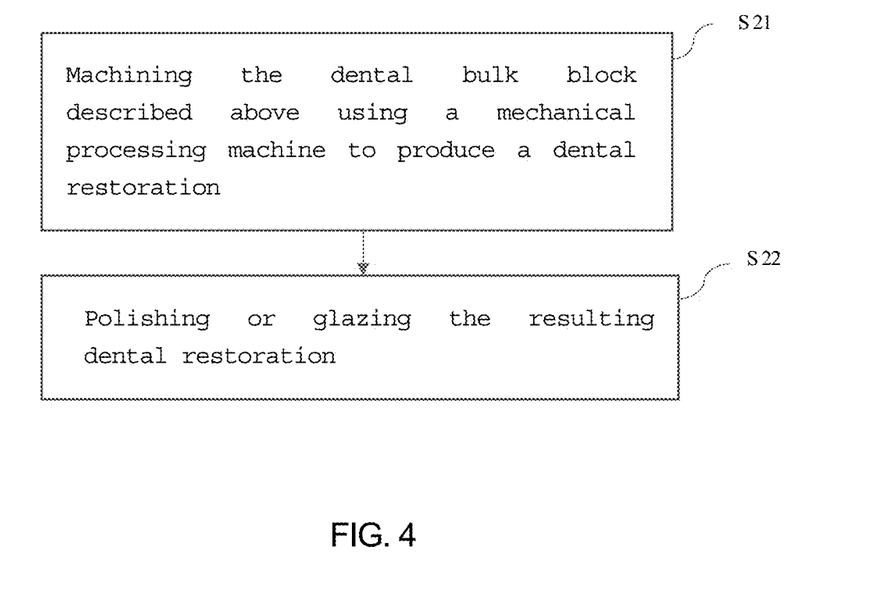
FIG. 4 illustrates an example flowchart for manufacturing a dental restoration in accordance with an embodiment of this disclosure.

FIG. 4 illustrates an example flowchart for manufacturing a dental restoration in accordance with an embodiment of this disclosure.

Specifically, a dental restoration manufacturing method according to one embodiment of the present disclosure includes the steps of: machining S21 the dental bulk block described above using a mechanical processing machine to produce a dental restoration; and polishing or glazing S22 the resulting dental restoration.

The glazing is performed at a temperature in a range of 730° C. to 820° C. for 30 seconds to 10 minutes. The glazing is a typical finishing heat treatment step in which the heat treatment causes little change in the transmittance. The glazing is performed in a temperature range that does not change the transmittance of the bulk block. The heat treatment for the glazing is performed for the surface healing by which fine cracks on the surface are reduced and the strength is increased by 50% or more.

In the dental restoration manufacturing method according to a specific embodiment of the present disclosure, the glazing is a heat treatment process performed at a temperature of 825° C. or higher and is performed to adjust the transmittance of the dental restoration produced. That is, a bulk block is first processed into a dental restoration, and then the blazing is used to adjust the brightness of the dental restoration by reducing the transmittance in a final finishing stage.

When manufacturing a dental restoration by machining a bulk block, there is a possibility that the transmittance of the resulting dental restoration is increased. In this case, if the bulk block is a conventional bulk block based on lithium disilicate, the dental restoration needs to be discarded. Next, a new bulk block with a desired transmittance is produced through a heat treatment process and the new bulk block is mechanically processed to produce a new dental restoration. That is, all of the process steps need to be performed again to produce a new dental restoration. However, in the case of using a bulk block according to the present disclosure to produce a dental restoration, since the bulk block according to the present disclosure has an advantage that the transmittance thereof can be adjusted depending on a heat treatment temperature, although a dental restoration produced by machining a dental block according to the present disclosure exhibits an undesired transmittance, it is not necessary to discard the produced dental restoration. That is, the transmittance of the dental restoration can be adjusted to fall within a desired transmittance range through the glazing process during the final finishing stage. That is, the colored artificial tooth can be simply restored through the glazing process described above.

Preferably, the glazing process is performed for 1 minute to 20 minutes at a temperature of at least 825° C.

The dental bulk block obtained through the method according to the present disclosure can significantly reduce the resistance to a machining tool when the dental bulk block is processed with a mechanical processing machine. Specifically, the dental bulk block is a glass ceramic block including an amorphous glass matrix and crystalline phases introduced into the matrix as illustrated in FIGS. 1 and 2. The crystalline phases include a major crystalline phase that corresponds to lithium disilicate and minor crystalline phases that correspond to lithium phosphate and at least one of spodumene and virgilite. The major crystalline phase has a size gradient in a depth direction, and the dental bulk block is a functionally graded material having no interface at a point where a size gradient value of the main crystalline phase changes. A dental bulk block having dimensions of 12 mm, 14 mm, and 18 mm was prepared. The dental bulk block was rotated at 250 RPM and was cut with an IsoMet™ low speed cutter (manufactured by Buehler, Germany) and a diamond electroplated wheel (2514485H17, Norton, USA), and the cutting times were measured. Cutting time was measured through the same method for each of the conventional bulk blocks including lithium disilicate-based blocks (Rosetta SM, manufactured by HASS Corp.), zirconia reinforced lithium disilicate-based bulk blocks (Celtra DUO, manufactured by Dentsplysirona) and LAS reinforced lithium disilicate bulk blocks (NICE, manufactured by Straumann).

The cutting resistances (%) were calculated on the basis of the measured cutting times. The cutting time of the lithium disilicate bulk block was assumed to be 100%, and the percentages of the cutting times of each of the other bulk blocks with respect to the cutting time of the lithium disilicate bulk block were calculated as respective cutting resistance values.

Figure 5:
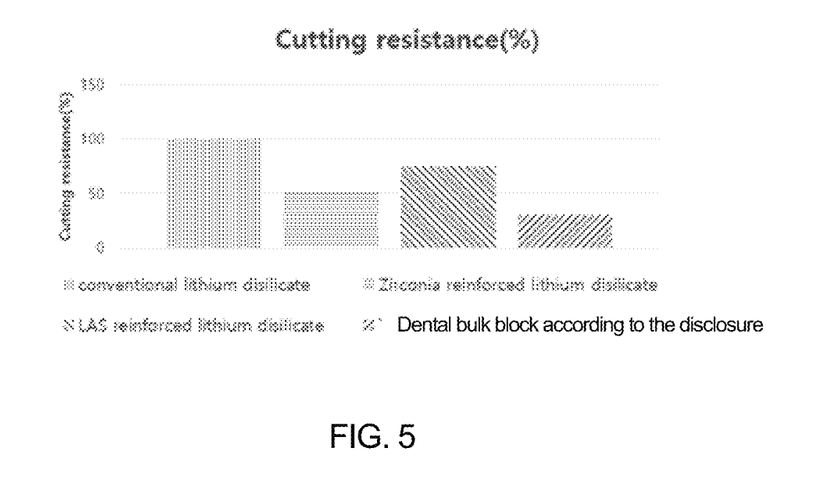
FIG. 5 is a comparative graph illustrating a cutting resistance value of a dental bulk block according to one embodiment of the present disclosure.

The cutting test results are illustrated in FIG. 5.

The test results of FIG. 5 show that the typical lithium disilicate bulk block exhibits the highest cutting resistance, the lithium alumino silicate (LAS) crystallized glass bulk block exhibits the second highest cutting resistance, and the dental bulk block according to the present disclosure exhibits the lowest cutting resistance. From these results, it is confirmed that the glass ceramic bulk block according to the present disclosure is most easily machinable.

According to a specific embodiment of the present disclosure, a glass composition is prepared by weighting and mixing 65.0 wt % to 73.0 wt % of $SiO_2$, 12.0 wt % to 14.0 wt % of $Li_2O$, 3.3 wt % to 8.2 wt % of $Al_2O_3$, 0.12 wt % to 0.22 wt % of ZnO, 2.8 wt % to 3.5 wt % of $K_2O$, 0.12 wt % to 0.22 wt % of $Na_2O$, and 2.0 wt % to 6.0 wt % of $P_2O_5$, in which a molar ratio of $Al_2O_3/(K_2O+ZnO)$ is within a range of 1.3 to 2.0.

$Al_2O_3$ is a glass modifier. When $Al_2O_3$ is added to silicate glass, $Al_2O_3$ enters into tetrahedral sites and functions as a glass former. On the other hand, when $Al_2O_3$ is contained in an excessive amount, $Al_2O_3$ acts as a glass modifier. When $SiO_2$ or $LiO_2$ that contributes to formation of lithium disilicate remains in a glass matrix, $SiO_2$ or $LiO_2$ reacts with $Al_2O_3$ serving as a glass modifier, thereby producing spodumene or virgilite crystalline phase which is a lithium alumino silicate-based crystalline phase.

In this case, $Li_2O$ can be replaced with $Li_2CO_3$, and a carbon component of $Li_2CO_3$ is discharged as carbon dioxide gas ($CO_2$) during the glass melting process. In addition, $K_2O$ and $Na_2O$ in the alkali oxides can be replaced with $K_2CO_3$ and $Na_2CO_3$, respectively, and a carbon component of $K_2CO_3$ and $Na_2CO_3$ is discharged as carbon dioxide gas ($CO_2$) during the glass melting process.

The mixing of the elements is preferably a dry mixing process. Specifically, a ball milling process may be used as the dry mixing process. The ball milling process is performed such that starting materials are charged into a ball milling machine, and the ball milling machine is rotated at a predetermined speed to mechanically pulverize and uniformly mix the starting materials. Balls used in the ball milling machine may be made of ceramic materials such as zirconia or alumina. All of the balls may have the same size. Alternatively, the balls may be a mixture of balls having two or more different sizes. The ball size, milling time, and rotation speed (revolutions per minute (RPM)) of the ball milling machine are determined depending on the target particle size. For example, to obtain the target particle size, the size of the balls is determined to be within a range of 1 mm to 30 mm, and the rotation speed of the ball milling machine is determined to be within a range of 50 rpm to 500 rpm. It is preferable to perform the ball milling for 1 hour to 48 hours depending on the target particle size. The starting materials are pulverized into fine particles with a uniform particle size and are uniformly mixed through the ball milling.

The blended particles of the starting materials are introduced into a melting furnace and are then melted in the melting furnace. Here, the term "melting" means that the starting materials are changed into a viscous material of a liquid state from a solid state. The melting furnace is preferably made of a material having a high melting point, a high strength, and a low contact angle to suppress the sticking of the melt. To this end, the melting furnace is made of platinum (Pt), diamond-like-carbon (DLC), or chamotte. Alternatively, the surface of the melting furnace is coated with platinum or diamond-like-carbon (DLC).

The melting is preferably carried out for 1 hour to 12 hours at a temperature in a range of 1400° C. to 2000° C. at normal pressure. When the melting temperature is lower than 1400° C., the starting material cannot be completely melted. On the other hand, when the melting temperature exceeds 2000° C., unnecessarily excessive energy consumption is required, thereby deteriorating the cost effectiveness. Therefore, the temperature of the melting process is suitably set to be within a range of 1400° C. to 2000° C. As to the melting time, the starting materials cannot be sufficiently melted when the melting time is too short, and unnecessarily excessive energy consumption is required when the melting time is too long. Therefore, if the melting time is excessively long, it is not cost effective. It is preferable that the heating rate of the melting furnace is set to be in a range of 5° C./min to 50° C./min. When the heating rate of the melting furnace is less than 5° C./min, it takes a long time for the melting process, thereby reducing the productivity. On the other hand, when the heating rate of the melting furnace is excessively high, the starting material volatilizes in a large amount so that the physical properties of the crystallized glass may deteriorate. Therefore, it is preferable to increase the temperature of the melting furnace at a rate within the above-described range. The melting process is preferably performed in an oxidizing atmosphere, i.e., in the presence of oxygen ($O_2$) or air.

The melt is poured into a predetermined mold to obtain a crystallized glass for a dental restoration having a desired shape and size. The mold is preferably made of a material having a high melting point, a high strength, and a low contact angle in order to suppress the sticking of the glass melt thereto. To this end, it is made of a material such as graphite and carbon. Preferably, the mold is preheated to a temperature range of 200° C. to 300° C., and then the melt is poured into the mold to prevent a thermal impact to the mold.

The melt contained in the mold is cooled and then annealed at a temperature within a range of 450° C. to 480° C. for a time period within a range of 20 minutes to 2 hours.

The resulting material is then transferred to a crystallization kiln and is subjected to nucleation and crystallization. As a result, crystallized glass is produced.

Figure 6:
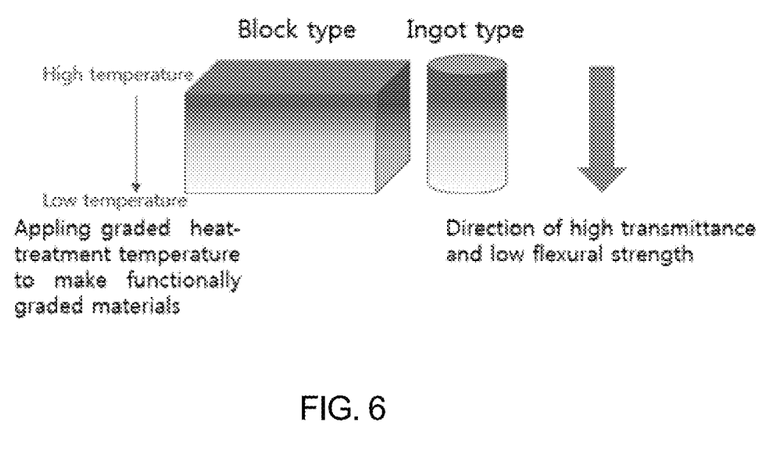
FIG. 6 is a schematic diagram illustrating a method of manufacturing a dental bulk block according to one embodiment of the present disclosure.

FIG. 6 schematically illustrates a method of performing a crystallization heat treatment by giving a temperature gradient, according to the present disclosure. When crystalizing a block-type bulk block or an ingot-type bulk block, high-temperature heat treatment is performed on an upper portion of the bulk block and low-temperature heat treatment is performed on a lower portion of the bulk block.

In the description herein, the temperature-gradient heat treatment is not limited to a specific apparatus or a specific method. For example, the temperature-gradient heat treatment may be performed in a temperature-gradient furnace and the operating temperature of the furnace may be set to be within a range of 900° C. to 1100° C. when taking into account the heat treatment temperature range.

Through the temperature-gradient heat treatment, the bulk block exhibits an increasing gradient in transmittance toward the lower end which is heat-treated at a relatively lower temperature from the upper end which is heat-treated at a relatively higher temperature and a decreasing gradient in flexural strength toward the lower end from the upper end. This is because the size of crystals in the crystallized glass is determined depending on the temperature. The crystalline phases generated through the temperature-gradient heat treatment include lithium disilicate as a major crystalline phase and lithium phosphate and at least one of spodumene and virgilite as minor crystalline phases. When the heat treatment is performed under a condition of a temperature gradient of 760° C. at the bottom of the bulk block to 880° C. at the top of the bulk block, the major crystalline phase exhibits a size gradient of 0.05 μm at 20.0 mm in depth to 1.5 μm at 0.0 mm in depth.

Figure 7:
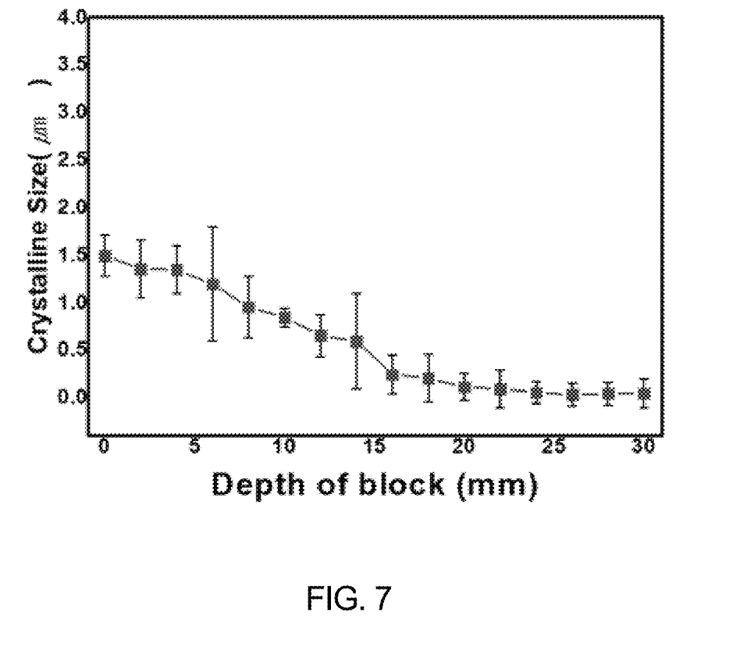
FIG. 7 is a graph illustrating a particle size of a major crystalline phase per depth of a dental bulk block according to one embodiment of the present disclosure.

The particle size of the crystalline phase at each of the predetermined depths of the bulk block obtained by the method according to the present disclosure is shown in FIG. 7.

Figure 8:
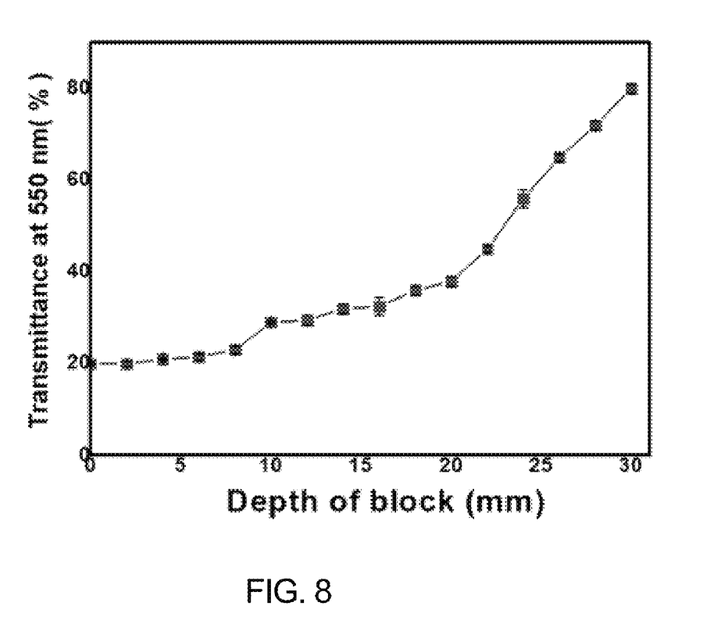
FIG. 8 is a graph illustrating changes in transmittance per depth of a dental bulk block according to one embodiment of the present disclosure.

The transmittance at each of the predetermined depth of the bulk block is shown in FIG. 8.

As shown in FIG. 8, the gradient of transmittance values may be within a range of 20% at the 0.0 mm in depth to 80% at the 30.0 mm in depth with respect to a wavelength of 550 nm.

Figure 9:
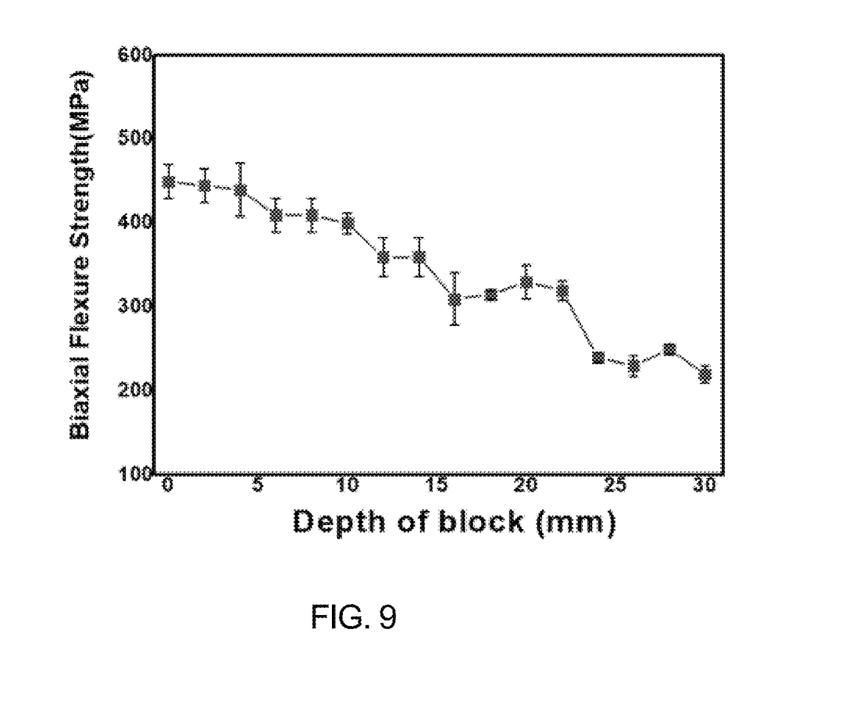
FIG. 9 is a graph illustrating flexural strength per depth of a dental bulk block according to one embodiment of the present disclosure.

The flexural strength at each of the predetermined depth of the bulk block is shown in FIG. 9.

As shown in FIG. 9, the gradient of flexural strength values is within a range of 220 MPa at 30.0 mm in depth to 450 MPa at 0.0 mm in depth.

Although the present disclosure has been described with reference to the exemplary embodiments illustrated in the drawings, the ordinarily skilled in the art will understand that various modifications and other equivalents to the exemplary embodiments are possible.

What is claimed is:

1. A machinable dental bulk block that is a glass ceramic block including an amorphous glass matrix and crystalline phases introduced into the matrix,
   wherein the crystalline phases comprise a major crystalline phase that corresponds to lithium disilicate and minor crystalline phases that correspond to lithium phosphate and at least one of spodumene and virgilite, and
   the machinable dental bulk block is made of a functionally graded material in which the major crystalline phase has a gradient of particle sizes in a depth direction such that particle sizes of the major crystalline phase are decreased in the depth direction from a top surface to a bottom surface of the dental bulk block, the functionally graded material having no interface at a point at which a gradient value of the particle sizes of the major crystalline phase changes,
   wherein light transmittance values of the dental bulk block are increased in the depth direction from the top surface to the bottom surface of the dental bulk block.

2. The machinable dental bulk block according to claim 1, wherein when the major crystalline phase has a particle size gradient in which an average particle size of the major crystalline phase is within a range of 0.05 to 1.5 μm.

3. The machinable dental bulk block according to claim 1, wherein the dental bulk block exhibits a gradient of transmittance values in the depth direction.

4. The machinable dental bulk block according to claim 3, wherein the gradient of transmittance values is within a range of 20% to 60% with respect to a wavelength of 550 nm.

5. The machinable dental bulk block according to claim 1, wherein the bulk block exhibits a gradient of L*, a*, and b* values in the depth direction, the L*, a*, and b* values being obtained through color difference analysis, and wherein a color difference ΔE varies within a depth range of 0.31 mm of the dental bulk block.

6. The machinable dental bulk block according to claim 1, wherein a degree of crystallinity is within a range of 35% to 70%.

7. The machinable dental bulk block according to claim 1, wherein the bulk block exhibits a gradient of flexural strength values in the depth direction.

8. The machinable dental bulk block according to claim 7, wherein the gradient of flexural strength values is within a range of 220 to 450 MPa.

9. The machinable dental bulk block according to claim 1, wherein the bulk block is made from a single glass composition.

10. The machinable dental bulk block according to claim 1, wherein the glass composition comprises 65.0 to 73.0 wt % of $SiO_2$, 12.0 to 14.0 wt % of $Li_2O$, 3.3 to 8.2 wt % of $Al_2O_3$, 0.12 to 0.22 wt % of ZnO, 2.8 to 3.5 wt % of $K_2O$, 0.12 to 0.22 wt % of $Na_2O$, and 2.0 to 6.0 wt % of $P_2O_5$, and wherein a molar ratio of $Al_2O_3/(K_2O+ZnO)$ is within a range of 1.3 to 2.0.

11. A method of manufacturing a dental restoration, the method comprising:
   preparing a predetermined dental restoration by machining the machinable bulk block of claim 1 with a mechanical processing machine; and
   polishing or glazing the resulting dental restoration.

12. The method according to claim 11, wherein the glazing is performed at a temperature within a range of 730° C. to 820° C. for a time period within a range of 3 seconds to 10 minutes.

13. The method according to claim 11, wherein the glazing is a heat treatment process performed at a temperature of at least 825° C. to adjust a transmittance of the dental restoration.

14. The method according to claim 13, wherein the glazing is performed at a temperature of at least 825° C. for 1 minute to 20 minutes.

15. A machinable dental bulk block that is a glass ceramic block including an amorphous glass matrix and crystalline phases introduced into the matrix,
   wherein the crystalline phases comprise a major crystalline phase that corresponds to lithium disilicate and minor crystalline phases that correspond to lithium phosphate and at least one of spodumene and virgilite, and
   the machinable dental bulk block is made of a functionally graded material in which the major crystalline phase has a gradient of particle sizes in a depth direction, the functionally graded material having no interface at a point at which a gradient value of the particle sizes of the major crystalline phase changes,
   wherein the glass composition comprises 65.0 to 73.0 wt % of $SiO_2$, 12.0 to 14.0 wt % of $Li_2O$, 3.3 to 8.2 wt % of $Al_2O_3$, 0.12 to 0.22 wt % of ZnO, 2.8 to 3.5 wt % of $K_2O$, 0.12 to 0.22 wt % of $Na_2O$, and 2.0 to 6.0 wt % of $P_2O_5$, and wherein a molar ratio of $Al_2O_3/(K_2O+ZnO)$ is within a range of 1.3 to 2.0.

* * * * *